Oct. 20, 1925.
C. A. HADLEY
1,558,353
ELECTRIC RESISTANCE WELDING
Filed July 8, 1924
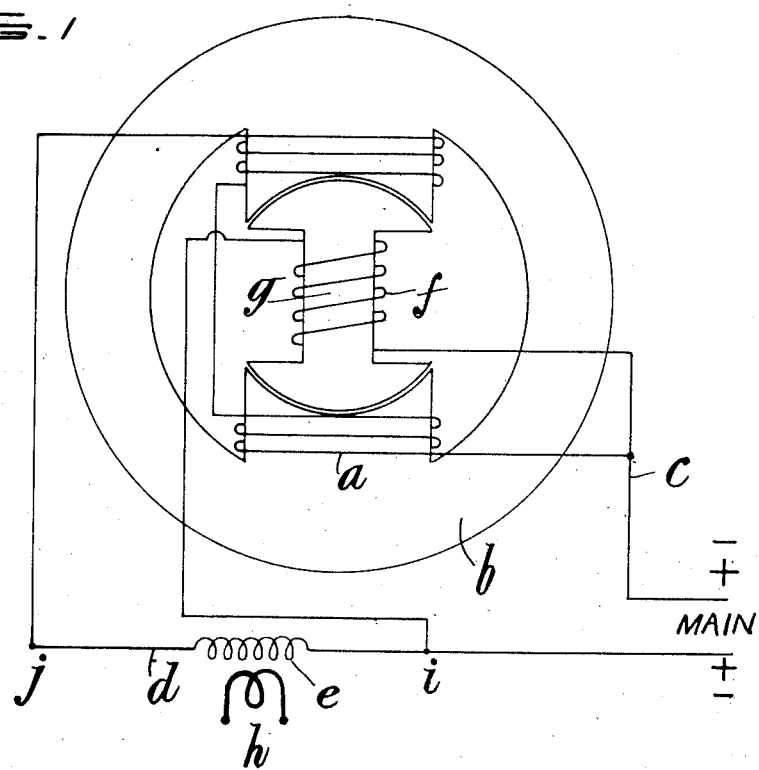
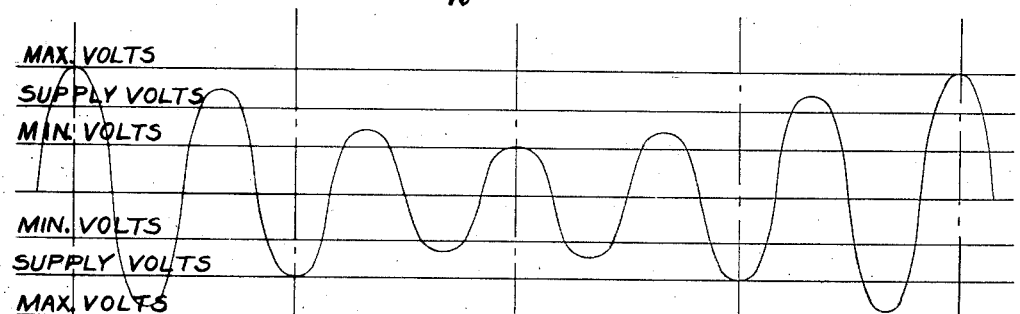
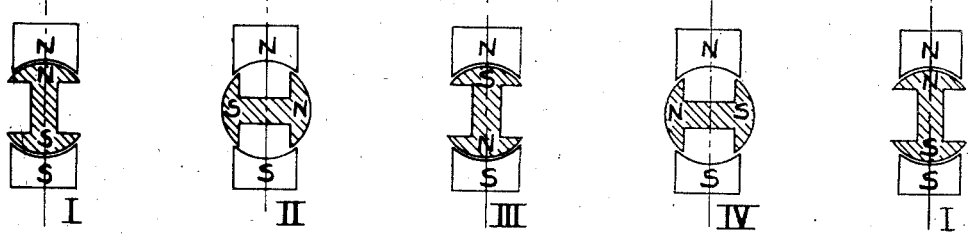
Fig. 2
Inventor
C. A. Hadley Patented Oct. 20, 1925.

1,558,353

UNITED STATES PATENT OFFICE.

CECIL ALLARTON HADLEY, OF INVERNESS, SCOTLAND.

ELECTRIC RESISTANCE WELDING.

Application filed July 8, 1924. Serial No. 724,900.

*To all whom it may concern:*

Be it known that I, CECIL ALLARTON HADLEY, a British subject, of 37 Island Bank Road, Inverness, Scotland, North Britain, have invented certain new and useful Improvements in Electric Resistance Welding, of which the following is a specification.

This invention relates to electric resistance welding and has for its object to provide an arrangement whereby the current in the welding circuit will be fluctuated during the welding operation, instead of interrupting the welding current or breaking the welding or supply circuit, so as to avoid sparking and thus eliminate the deleterious effect due thereto.

According to the present invention, the current is caused to fluctuate between a maximum and minimum value, instead of being interrupted by breaking the circuit with a switch or the like, with the object of obtaining a series of spot welds, each being distinct and separate from one another, or overlapping in accordance with the relative speed of travel of the work passing between the welding electrodes, and the number of alterations of the current value in a given time. The welding electrodes are preferably in the form of rolls continually or intermittently driven, and, when the work is passed between a pair of such rolls, the rolls serve to convey the current necessary to heat the material to be welded, and at the same time apply the necessary pressure which is required to complete the weld. The rolls may also be rotated in such a manner that they draw the work between them at the desired speed. Alternatively, the work may be fixed upon a conducting mandrel, and a roll traversed over the place where the weld is required, or vice versa. When a point electrode is used, the work is fed at the required speed by separate means. In this case the pressure applied to the welding electrodes is intermittent and in synchronism with the current impulse.

In this manner the heat is concentrated at the point where welding is to take place, whilst the parts of the remote parts of the work, for instance, those engaged by the pressure clamps, pressure rolls or the like will not reach the welding temperature and the liability of such parts being overheated or burnt is reduced to a minimum. The fluctuation of the current is preferably effected by the use of an induction regulator interposed between the source of supply of alternating current and the welding transformer or transformers. This regulator has a winding in series with the primary winding or windings of the welding transformer or transformers, whilst a second winding is arranged in shunt with the first winding. These windings are relatively rotatable, and so arranged that one point of the shunt winding induces an increased voltage in the series winding, and, at another position, as the rotor continues to revolve, the voltage in the series circuit is reduced in value, thus increasing and decreasing the current going through the welding circuit, and the temperature at the welding electrodes.

The invention will now be described with reference to the accompanying drawings showing by way of example one form of regulator arranged in accordance with the invention.

In the drawing—

Fig. 1 shows the regulator and its connections to the source of supply of current and to the welding circuit, and Figure 2 shows a diagram of the voltage curve in various relative positions of the stator and rotor.

On the stator $b$ of the regulator is wound a winding $a$ which is connected at one end $c$ to one of the alternating current supply mains or to one terminal of an alternator, whilst its other end $d$ is connected to the primary winding $e$ of the welding transformer connected to the other supply main or to the other terminal of the alternator, so that the winding $a$ will be in series with the primary winding $e$ of the welding circuit. The secondary of the welding circuit is indicated at $h$. For the sake of clearness only one welding circuit is shown, but it will be understood that a number of welding circuits may be provided, the primaries being arranged in series or parallel between the points $i$ and $j$.

A second winding $f$ around the rotor $g$ of the induction regulator is arranged in shunt across the supply mains or across the terminals of the alternator. According to the position of the rotor poles relatively to the poles of the stator, between which the rotor is mounted, the current in the welding circuit will be increased or decreased. For the purpose of illustration it may be assumed that both the stator and the rotor each have one pair of poles as illustrated, and arranged for a single phase circuit.

When, therefore, the poles of the rotor are opposite to similar poles of the stator, the voltage of the stator circuit will be increased in value, as indicated in position I, Fig. 2, in proportion to the relative number of turns on the stator and rotor. If now the rotor is turned through an angle of 90° no additional voltage will be induced in the stator; but the current supplied to the welding electrodes will be due to the normal supply voltage as indicated in position II, Fig. 2. When, however, the rotor is turned through a further 90°, position III, Fig. 2, the voltage induced in the stator by the rotor will be reversed. Extra voltage will thus be subtracted instead of being added to the normal voltage, and the current passing between the welding electrodes will now be insufficient to produce a welding temperature. On turning the rotor through another 90°, into position IV, Fig. 2, the current passing through the stator winding will return to its normal value and on completing a revolution the current in the stator winding will again reach its maximum value.

In actual practice the rotor of the induction regulator will be driven at a suitable speed in order to produce the desired current fluctuations, the source of supply being connected to slip rings from which the current is conducted to the roter winding by brushes. If, for example, the current in the welding circuit is to be varied alternately from its maximum to minimum value ten times per second the rotor would be driven at a speed of 10 revolutions per second, so that in the case of spot welding 10 spots would be welded per second.

It will be understood that instead of arranging the stator winding in series with the welding circuit the rotor winding could be connected in series therewith, in which case the stator winding would form the shunt.

What I claim is—

1. In electric resistance welding the combination with a welding transformer and a source of supply of alternating current therefor, of an induction regulator disposed between the source of supply of alternating current and the welding transformer, a primary winding on said induction regulator in series with the welding transformer, and a secondary winding on said induction regulator in shunt with the primary winding and with the welding transformer, said primary and secondary windings being relatively rotatable whereby the current through the welding transformer is caused to fluctuate between maximum and minimum values.

2. In electric resistance welding the combination with a plurality of welding transformers and a source of supply of alternating current therefor, of an induction regulator disposed between the source of supply of alternating current and the welding transformers, a primary winding on said induction regulator in series with the welding transformers, and a secondary winding on said induction regulator in shunt with said primary winding and with the welding tranformers, said primary and secondary windings being relatively rotatable, whereby the current through the welding transformers is caused to fluctuate between maximum and minimum values.

3. In electric resistance welding the combination with the primary winding of a welding transformer and means for supplying an alternating current thereto, of a primary coil in series with the primary winding of the welding transformer, a secondary coil in shunt with said primary coil and with the primary winding of the welding transformer, and means for relatively rotating the primary and secondary coils.

4. In electric resistance welding, a plurality of welding transformers having primary and secondary windings, means for supplying alternating current to said primary windings, a primary coil arranged in series with the primary windings of said welding transformers, and a secondary coil in shunt with said primary coil and said primary windings and means for relatively rotating the primary and secondary coils.

5. In electric resistance welding, a plurality of welding transformers each having a primary and a secondary winding, the said primary windings of all of said transformers being arranged in series, means of supply of alternating current to said primary windings, an induction regulator between the said transformers and said source of supply, a primary coil on said induction regulator, said primary coil being in series with said primary windings, and a secondary coil on said induction regulator, said secondary coil being in shunt in relation to the primary coil and said primary windings, said primary coil and said secondary coil being relatively rotatable.

6. In electric resistance welding the combination with a welding transformer and a source of supply of alternating current therefor, of an induction regulator disposed between the source of supply of alternating current and the welding transformer, a primary winding on said induction regulator in series with the welding transformer and a secondary winding on said induction regulator in shunt with the primary winding and said welding transformer, said primary and secondary windings being relatively rotatable in such a manner that in one position the secondary winding induces an increased voltage in the primary winding, and in another position the voltage in the primary winding is reduced, whilst in intermediate positions the current supplied to the welding transformer will be due to the normal supply voltage.

7. In electric resistance welding the combination with a plurality of welding transformers and a source of supply of alternating current therefor, of an induction regulator disposed between the source of supply of alternating current and the welding transformers, a primary winding on said induction regulator in series with the welding transformers, and a secondary winding on said induction regulator in shunt with said primary winding and said welding transformers, said primary and secondary windings being relatively rotatable in such a manner that in one position the secondary winding induces an increased voltage in the primary winding and in another position the voltage in the primary winding is reduced, whilst in intermediate positions the current supplied to the welding transformers will be due to the normal supply voltage.

8. In electric resistance welding the combination with the primary winding of a welding transformer, of means for supplying alternating current thereto, a rotor, a stator, a coil on said stator in series with said primary winding, a coil on the rotor in shunt with said first mentioned coil and with said primary winding, and means for rotating the said rotor.

In testimony whereof I have signed my name to this specification.

CECIL ALLARTON HADLEY.